Figure 2:
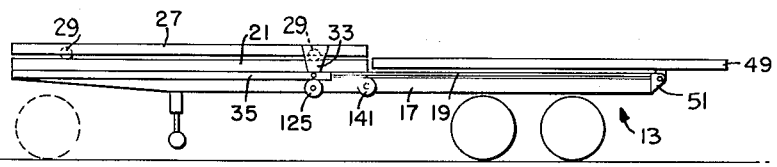

Sept. 26, 1961  W. D. ROUSE  3,001,825
TANDEM DUMPING-PLATFORM TRUCK
Filed Jan. 7, 1957  4 Sheets-Sheet 1

INVENTOR.
William D. Rouse
BY
Peck & Peck

Sept. 26, 1961   W. D. ROUSE   3,001,825
TANDEM DUMPING-PLATFORM TRUCK
Filed Jan. 7, 1957   4 Sheets-Sheet 2

INVENTOR.
BY *William D. Rouse*
*Peck & Peck*

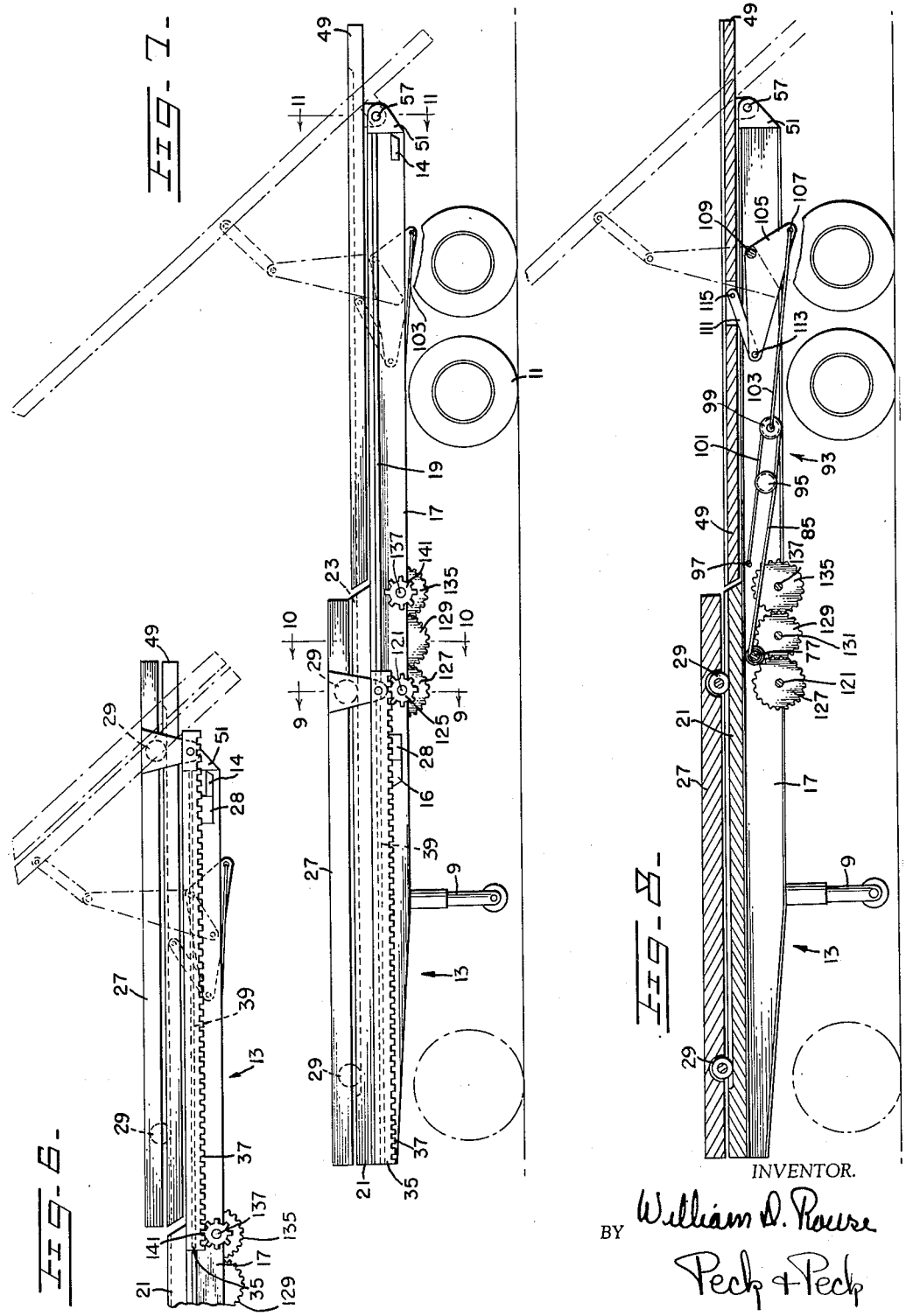

Sept. 26, 1961  W. D. ROUSE  3,001,825
TANDEM DUMPING-PLATFORM TRUCK
Filed Jan. 7, 1957  4 Sheets-Sheet 4
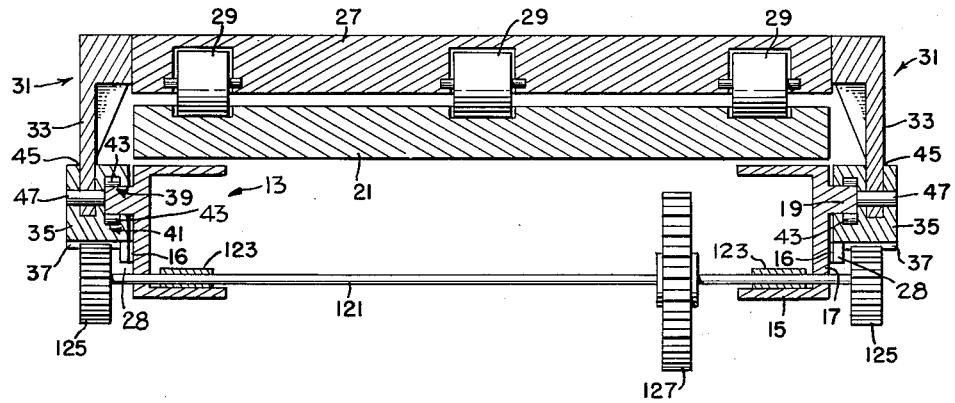
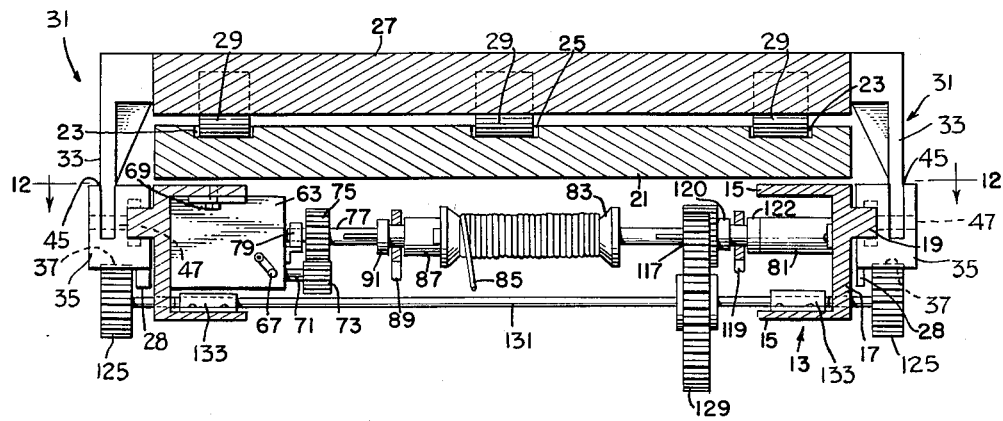
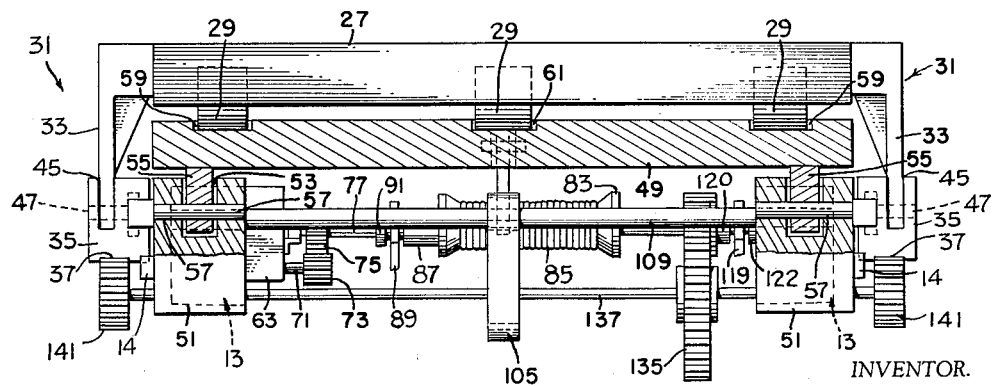
INVENTOR.
William D. Rouse
BY
Pech & Pech

United States Patent Office 3,001,825
Patented Sept. 26, 1961

3,001,825
TANDEM DUMPING-PLATFORM TRUCK
William D. Rouse, Dover-Foxcroft, Maine
(Box 31, Rte. 1, Burke, Va.)
Filed Jan. 7, 1957, Ser. No. 632,752
3 Claims. (Cl. 298—8)

This invention relates broadly to the art of load carrying vehicles and in its more specific aspects it relates to a load carrying vehicle adapted to carry heavy loads composed of several units and provides a unique arrangement whereby the loads may be separately dumped from the vehicle; and the nature and objects of the invention will be readily recognized and understood by those skilled in the arts to which it relates in the light of the following explanation and detailed description of the accompanying drawings illustrating what I at present believe to be preferred embodiments or mechanical expressions of my invention from among various other forms, arrangements, combinations and constructions, of which the invention is capable within the spirit and scope thereof.

In the transportation of many types of relatively heavy goods on trucks the unloading of such goods from the truck presents a serious problem. The unloading difficulties are increased when the truck is of considerable length for the goods being carried in the fore part of the truck must be moved to the rear end of the truck for the unloading operation.

As one example of a class of goods which has posed many and substantial problems in the unloading thereof is flooring and the like kinds of lumber which involves strips of considerable length. Flooring boards as furnished to construction projects and the like are of substantial length and they are usually furnished in bales, each bale comprising a plurality of individual boards so that a bale constitutes a unit of substantial weight and length and is not an easy or convenient mass to handle.

In the transportation of such bale units it is customary to use relatively long trailer trucks and to load the bales not only in side by side position but also in end to end relation on the truck. The bale or bales positioned on the truck adjacent the rear end thereof are more accessible for unloading than are those which are positioned adjacent the fore end of the truck, yet due to the weight and size of the units even those at the rear end of the truck are difficult to unload.

Because of the weight and size of the units it will be appreciated that manual unloading is not feasible. The use of cranes is expensive and time consuming. There is therefore a definite need for a practical, efficient and economical means for unloading products of the general character of those described.

It has been one of my purposes to provide means for unloading relatively long and heavy loads from trucks and particularly where the load is made up of a plurality of separate units. In accomplishing this broad purpose I have provided an arrangement whereby the load units positioned adjacent the rear end of the truck may be unloaded by a dumping operation separately from and without disturbing those load units positioned in the fore part of the truck. When such rear load has been dumped from the truck I have devised mechanical means for shifting the load in the fore part of the truck to the rear thereof for its dumping from the truck.

The advantages of such an arrangement are many and will become fully apparent as this description proceeds. It will be recognized that dumping the load in more than one operation reduces the weight of the load at each dumping operation and thereby reduces the power required for the dumping with a resulting reduction in the initial capital outlay and operating costs.

In order to accomplish my purposes in an economical and efficient manner I have provided a truck or trailer having a load supporting bed consisting of separate supporting or platform sections normally positioned in tandem relation and I have so mounted and arranged these sections that they are independently operable in performing their functions.

The construction, whereby the highly desirable and advantageous features and results which are inherent in my invention are obtained, involves a bed on a truck or trailer truck having three components, a rear tiltable section, a forward fixed section and a forward longitudinally shiftable section which is also tiltable about a horizontal axis to cause the load to slide therefrom. Thus the load on the rear tiltable section is caused to slide from said section when it is tilted and when the forward section is shifted to its rearmost position and tilted the load carried thereon is caused to slide therefrom.

A further purpose of my invention is to provide only one mechanism which is operable to cause tilting of both the rear section and the forward shiftable section and I have accomplished this purpose by causing the forward section to move rearwardly over the rear section when said forward section is to be unloaded by tilting. Thus to tilt the forward section when in its rearmost position it is only necessary to actuate the mechanism for tilting the rear section and the tilting of the rear section causes the tilting and unloading of the forward section. Hence the forward section is caused to tilt by the tilting of the rear section.

The mechanism by means of which I obtain the unloading features of my invention may be relatively easily combined with present truck and trailer bodies without requiring substantial reconstruction thereof.

In providing an economical and simple arrangement for operating the dumping parts of my truck I have not sacrificed sturdiness and operating efficiency, instead I have designed operating mechanisms which will withstand the hard usage to which they will be subjected in actual use.

With the foregoing general objects, features and results in view, as well as certain others which will be apparent from the following explanation, the invention consists in certain novel features in design, construction, mounting and combination of elements, as will be more fully and particularly referred to and specified hereinafter.

Figure 3:
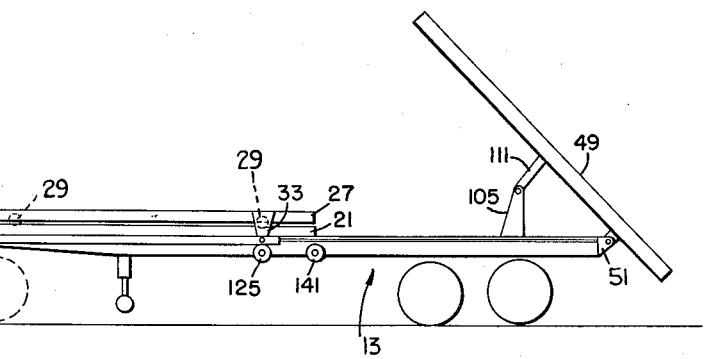
Figure 4:
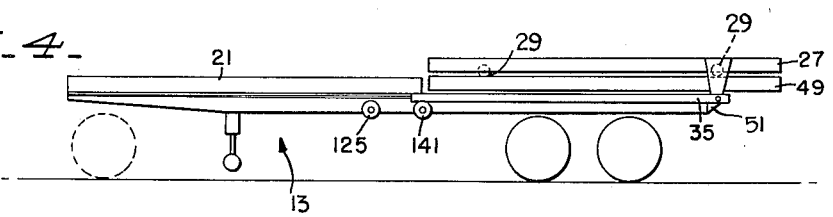
Figure 5:
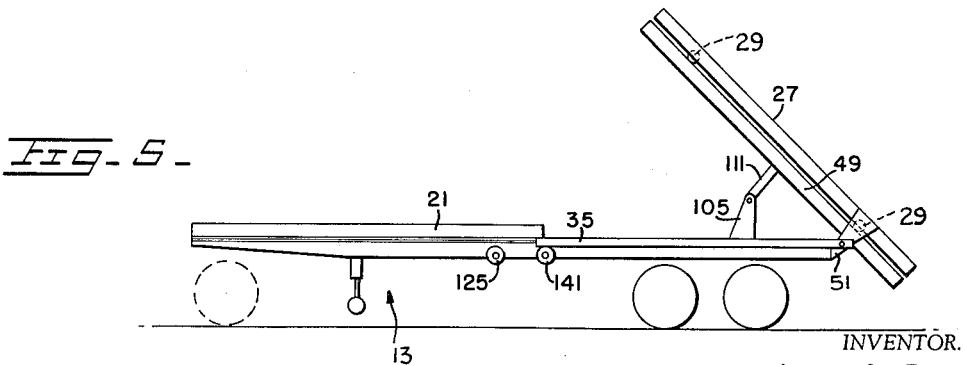

Referring to the accompanying drawings:
FIG. 1 is a view in side elevation of a trailer truck equipped with my invention.
FIG. 2 is a diagrammatic view in side elevation of a trailer equipped with my invention and illustrating the bed or supporting sections in normal load carrying positions.
FIG. 3 is a diagrammatic view similar to FIG. 2 but with the rear section in tilted unloaded position.
FIG. 4 is a diagrammatic view similar to FIGS. 2 and 3 but with the forward section longitudinally shifted rearwardly over the rear section.
FIG. 5 is a diagrammatic view similar to FIGS. 2, 3 and 4 but with both the rear and forward sections being tilted for unloading the forward section.
FIG. 6 is a view in side elevation of the rear portion of the trailer body with the forward section shifted rearwardly to position over the rear section.
FIG. 7 is a view in side elevation of the trailer with the forward section in normal forward load carrying position.
FIG. 8 is a side view of the trailer in vertical section.
FIG. 9 is a view taken on line 9—9 of FIG. 7.
FIG. 10 is a view taken on line 10—10 of FIG. 7.
FIG. 11 is a view taken on line 11—11 of FIG. 7.
FIG. 12 is a view taken on line 12—12 of FIG. 10.

In the accompanying drawings I have used the numeral 1 to designate in its entirety any type of cab including the motive power for towing a trailer designated generally by the numeral 3. The cab 1 may include a hood 5 housing a usual motor and operating any conventional type of compressor for maintaining a supply of compressed air in a tank 7.

The trailer 3 to which my invention pertains is of elongated construction and is supported in the usual manner at its front end on the cab 1 and may be provided with a conventional support 9 for supporting the front end of the trailer when it is not coupled to the cab. Duel wheels 11 are shown as supporting the trailer on the road.

The trailer 3 is provided with longitudinal side frames designated generally by the numeral 13 each of which is of generally channel shape and consists of a pair of inwardly directed flanges 15 connected by a web 17 and a slide forming flange 19 which extends outwardly from the web of each side frame and extends throughout the length of the side frame. Any suitable transverse reinforcing means extending between and connected to the side frame members may be used. Adjacent the rear end of each side frame I provide a stop element 14 on the outer side of the web 17 and forwardly spaced therefrom and in alignment therewith I provide a further stop element 16. The function of these stop elements will be made clear as this description proceeds.

As I have stated above the supporting bed or the platform of the truck comprises several independently operable sections which in effect divide the load supporting body of the truck or trailer into a forward section and a rear section. The forward section of the trailer includes a stationary platform 21 which is mounted on the side frames 13 in any suitable manner, as by means of blocks fixed at the ends thereof which are fixed to and supported on the frame members, or in any other suitable and convenient manner. The stationary platform 21 is of generally rectangular configuration and may be of a width to extend across the frame members 13 and may be of a length somewhat more than half the length of the side frame members. A pair of transversely spaced longitudinally extending grooves 23 are formed in the upper surface of the stationary platform 21 while a central longitudinally extending groove 25 is also formed in the upper surface of the platform 21. The purpose of these grooves will be explained in detail hereinafter.

I provide a forward load supporting platform 27 which comprises a rigid structure of substantially the same dimensions as those of the stationary platform 21. The forward load supporting platform 27 is movably supported in normal position by and spaced above the stationary platform 21 by means of sets of rollers 29 which are seated in and adapted to roll in the grooves 23 and 25 which are provided in the stationary platform. While I have illustrated two sets of three transversely spaced rollers it is to be understood that the number of rollers may be varied and if found desirable the central groove and corresponding rollers may be eliminated. The forward load supporting platform 27 is also operably supported by means of a pair of brackets designated generally by the numeral 31, one bracket being fixed to each side edge of the platform adjacent to but forwardly spaced from the rear end thereof and each bracket has a leg 33 depending downwardly from the edge of the platform.

The forward load supporting platform is normally positioned either with or without its load in position over and spaced from the stationary platform 21, however it is a purpose of my invention to so mount the platform 27 that it may be shifted longitudinally of the trailer to a rearward position for tilting and dumping the load supported thereon. In order to provide means for moving this platform I provide a pair of rack bars 35 having teeth 37 formed along their lower edges. Each rack bar is formed with a longitudinally extending slot 39 cut inwardly from its inner side which slot is in communication with upper and lower slots 41 formed in the rack bar. A rack bar is slidably mounted on each frame member 13 by positioning a rack bar so that the slide flange 19 of the frame member is inserted into the slot 39, roller bearings 43 being positioned in the upper and lower slots 41 so that the rack bars will move smoothly and easily along the frame members on the slide flanges. Adjacent its rear end each rack bar is provided with a slot 45 extending downward from its upper edge and a pivot pin 47 extends through the rack bar and the slot 45. When the forward platform 27 is operatively mounted the legs 33 of the brackets 31 are received in the slots 45 and a pivot pin extends through a hole which is provided in the lower end of each leg of each bracket. It will now be understood that when the rack bars are moved along the frame members the forward load supporting platform 27 will be shifted longitudinally of the trailer. Each rack bar carries a stop element 28 which depends therefrom, the purpose of which will be explained.

My load supporting structure also comprises a rear load supporting platform 49 which is of substantially the same thickness and width as the stationary platform 21 and of substantially the same length as the length of the forward load supporting platform 27. Fixed on the rear end of each frame member 13 is a bracket 51, each bracket being provided with a slot 53 extending downwardly from the upper surface thereof. I provide a pair of transversely spaced legs 55 fixed to and depending from the underside of the rear load supporting platform 49, each leg 55 being received in a slot 53 of a bracket and being pivotally maintained and mounted therein by means of a pivot pin 57. Thus the rear end of the rear load supporting platform is pivotally mounted by means of the just described arrangement and the forward end of this rear platform may be supported and rest on the frame members 13. The rear load supporting platform is provided on its upper surface with transversely spaced longitudinally extending grooves 59 and a central longitudinally extending groove 61, the grooves 59 and 61 being in alignment with the grooves 23 and 25, respectively, of the stationary platform 21 so that when load supporting platform 27 is shifted rearwardly its rollers will be received in the grooves 59 and 61.

As will now be apparent the rear load supporting platform 49 is tiltably or rockably mounted on the brackets 51 and the forward load supporting platform 27 is longitudinally shiftable from its forward normal position to its rearward dumping position over the rear platform 49. I have provided mechanism whereby the rear load supporting platform may be tilted upwardly on a horizontal axis to dump its load and I have provided mechanism for longitudinally shifting the forward load supporting platform rearwardly to position over the rear load supporting platform for its tilting on the same horizontal axis and with said rear load supporting platform.

I provide a motor 63, which may be a compressed air motor, which is connected with the compressed air tank by means of a hose 65 for its powering by the compressed air. Any suitable control means 67 may be provided for operating the motor in its forward and reverse directions. The motor may be mounted on one frame member 13 by means of a bolt or the like 69. The motor drives a stub shaft 71 which mounts a pinion 73 on the outer end thereof, the pinion 73 being in mesh with a driving gear 75 which is fixed on a shaft 77 which at one end may be journalled in any suitable bearing sleeve or bracket 81 which is fixed to the web 17 of the frame member 13.

Mounted on the shaft for relative rotation with respect thereto but restrained by any suitable and conventional means against axial movement thereon is a reel or drum 83 adapted to receive a cable 85 for winding and unwinding therearound. While the reel is normally loosely mounted on shaft 77 so that the shaft may rotate while the reel remains stationary, I provide means under the control of the operator for causing the reel to rotate with the shaft to thereby wind or unwind the cable depending upon the direction of rotation of the shaft which is operated by the reversible motor 63. Such means may comprise a clutch 87 which is splined on shaft 77 and is axially moved to or away from clutching engagement with the reel by any suitable control means 89 which extends between an end of the reel and a collar 91 which is fixed to the clutch in spaced relation with respect thereto. Thus, by moving the clutch to the right as viewed in FIG. 10 the reel will be caused to rotate with the shaft while moving the clutch to the left by operating means 89 will disengage the clutch from the reel and the reel will not be rotated by the shaft.

The reel 83 is in effect a windlass mechanism controlling the cable 85 which cable as will become apparent is operable to tilt the rear load supporting platform 49 in the dumping operation. In order to gain a mechanical advantage for the windlass I may provide a block and tackle device designated generally by the numeral 93 which includes a pulley block 95 which receives cable 85 from the reel, the cable at its other end being fixed as at 97. A further pulley block 99 is the load block and is connected to the block 95 by a tackle 101. The load cable 103 extends from pulley block 99 rearwardly for connection to a triangular crank member 105 at the rearmost apex thereof as at 107. The member 105 being pivoted on a cross rod 109 which extends between and is fixed to frame members 13. At the apex of member 105 opposite that to which the cable is connected I pivotally fix a link 111 as at 113, the other end of the link being pivotally fixed to rear load supporting platform 49 as at 115 in an aperture provided therein. Consideration of the drawings indicates that the pivotal connection 115 for the linkage is forwardly spaced from the pivoting points 57 for the rear platform 49. As will be described hereinafter the reel, cable and linkage just described when actuated causes the rear load supporting platform to tilt upwardly on pivots 57 in order to dump the load therefrom.

A further pinion 117 is mounted on drive shaft 77 between reel 83 and bearing 81, the pinion 117 being splined on said shaft and being axially moveable on the shaft to and from splined position and free position by means of any suitable control element 119 which is operated between spaced collars 120 and 122 to move the pinion to position where it will rotate with the shaft and to position where it will be stationary and will not rotate with the shaft.

Forwardly spaced from and in a plane below shaft 77 I provide a rack actuating shaft 121 which extends transversely of the trailer and generally parallel to shaft 77, the shaft 121 being journalled in a bearing bracket 123 on the lower flange 15 of each frame member 13 and projecting at each end through and beyond the webs 17 of each frame member. A rack pinion 125 is fixed on each end of shaft 121 for rotation therewith. Consideration of the drawings and particularly FIG. 9 shows that the pinions 125 are in mesh with the teeth 37 of the rack bars 35 so that linear movement will be imparted to the rack bars when pinions 125 are caused to rotate upon rotation of the shaft 121. Rotation is imparted to said shaft 121 by means of gear 127 which is fixed thereon and is in mesh and driven by a driving gear 129 which is in mesh with and is driven by the pinion 117. The driving gear 129 is mounted on a transverse rod or shaft 131 which is journalled in bearings 133 mounted on the lower webs 15 of each frame member 13. Consideration of the drawings indicates that driving gear 129 is rearwardly spaced relative to shaft 77 and is in a plane below said shaft, the gear 127 being slightly further removed from pinion 117 than is driving gear 129. A further driven gear 135 is in mesh with and driven by gear 129, the driven gear 135 being mounted on a shaft 137 which is journalled in bearings 139 mounted on frame members 13. Each end of shaft 137 extends through the webs 17 of frame members 19 and mounts a rack pinion 141 on each end. The shafts 137 and 121 are in the same horizontal plane as are the rack pinions 125 and 141.

When the tandem dump truck is in condition to be loaded with a plurality of load units the various independently operable load supporting members are positioned as particularly illustrated in FIGS. 1 and 2 of the drawings, thus the forward load supporting platform is in its normal forward load supporting position over the stationary platform or bed 21, the forward movement of the platform being stopped when stop elements 28 engage the fixed stop projections 16. The platform 27 being operated by and fixed to the rack bars 35, such bars will be in their forward positions with the teeth 37 thereof in mesh with the forward rack pinions 125 but not engaged with the rear rack pinions 141. The rear load supporting platform 49 will be in horizontal load receiving and supporting position. With the members in the position described one or more load units may be placed on forward platform 27 and one or more separate load units may be placed on rear platform 49 and the loaded trailer or truck may then be driven to the unloading site, for separately dumping the load units on the forward and rear load supporting platforms.

When the unloading site is reached and it is desired to unload the truck the operator adjusts the control 67 on motor 63 so that the shaft 77 will be rotated in a counter clockwise direction when the shaft is viewed from the left hand end of FIG. 12, he then manipulates control 89 to cause clutch 87 to engage reel 83 to cause rotation thereof and a consequent winding of cable 85 on the reel. The winding of the cable on the reel actuates the linkage mechanism through the block and tackle 93 pivoting crank 105 around rod 109 and through link 111 causing rear load supporting platform 49 to be rocked or tilted upwardly on pivots 57 into the position illustrated in FIG. 3 of the drawings and in dotted lines in FIGS. 6, 7 and 8. The motor is then stopped so that the platform will be held in its tilted position. The load carried on rear load supporting platform 49 will slide therefrom and if necessary the trailer may be moved forward to aid the unloading. It will be understood that during the operation of tilting the rear platform for its unloading the forward platform 27 will be maintained in its normal forward position as disclosed in FIG. 3, and the pinion will be in unsplined position on shaft 77 so that it and the driving gear 129 will not be actuated. When the load has been dumped from rear platform 49 the operator reverses the direction of the motor to permit slow unwinding of the cable and lowering of the rear platform to its normal horizontal position. The motor 63 is stopped and the clutch 87 disengaged from the reel.

With the rear load supporting platform unloaded and empty the forward load support platform 27 may be unloaded. In order to accomplish this the pinion 117 is moved into splined relation with drive shaft 77 and the motor 63 is started to drive the shaft in a counter clockwise direction when viewed from the left hand end of FIG. 12. This actuates pinion 117 and through gears 127, 129 and 135 and their shafts the sets of pinions 125 and 141 are caused to rotate in a clockwise direction as viewed in FIG. 7. When the rack pinions are rotated the forward pinions 125 which are in mesh with the teeth of the rack bars will move the rack bars rearwardly and when moved sufficiently the rear rack pinions 141 will engage the teeth on the rack bars. Movement of the rack bars along slide flanges 19 will of course impart a corresponding longitudinal movement to forward load supporting platform 27. The rack bars will be moved until stops 28 abut stops 14 whereupon pinion 117 will be shifted out of splined engagement with shaft 77 and movement of the rack bars and platform 27 will stop and the members will be in the positions illustrated in FIG. 4. When the forward load supporting platform is in this position its pivots will be in alignment with pivots 57 of platform 49. The forward platform is now in position to be tilted for dumping its load.

The rear load supporting platform 49 is used as the actuating means for tilting the forward load supporting platform 27 into dumping position. Hence with the platforms in the positions illustrated in FIG. 4 of the drawings the two platforms are tilted into the position disclosed in FIG. 5 of the drawings by operating motor and reel to tilt rear platform 49 as described above. Since the pivots of platforms 27 and 49 are in axial alignment the tilting of the platform 49 will tilt the platform 27. When the load has been dumped the two platforms are lowered in the same manner as described in connection with the lowering of platform 49. When the platforms are in horizontal position the platform 27 is shifted forwardly into normal position over bed 21 by reversing the direction of motor 63 and engaging pinion 117 with shaft 77, the clutch 87 being, of course, disengaged from the reel 83. In all of the described operations it will be recognized that when clutch 87 is engaged the pinion 117 is not in splined relation with shaft 77 and vice versa.

It is also to be understood that any suitable types of motor, clutch and gear controls may be used and such controls may be extended in any convenient and suitable manner for accessibility to the operator of my tandem dump truck.

I claim:
1. A dump truck including, in combination, a supporting framework having a forward portion and a rearward portion, wheels movably carrying said framework, said framework including longitudinally extending transversely spaced side members, a rack slidably mounted on each side member for longitudinal movement therealong, a pair of pinions mounted on said framework, one in engagement with each rack and means for rotating said pinions to cause longitudinal movement of said racks, a supporting platform adapted to support a load, said supporting platform movably supported on said framework, pivot means on said racks, means fixed to said supporting platform and connected to said pivot means for pivotally supporting and connecting said supporting platform to said racks for longitudinal movement therewith, said racks and platform being normally positioned at the forward portion of said framework and being movable to and from normal position to a position at the rear portion of said framework, and a further platform adapted to support a load, said further platform pivotally mounted at the rear portion of said side members in a plane below said supporting platform and tiltable on said side members for dumping its load, and said first mentioned platform being tiltable on said racks only when it is in position at the rear portion of the framework for dumping its load, and means for tilting said platforms.

2. A dump truck in accordance with claim 1, wherein each side member is provided with an outwardly extending slide flange and a rack is slidably mounted on each slide flange.

3. A dump truck including, in combination, a supporting framework, wheels for movably carrying said framework, a pair of supporting platforms each adapted to support a load and each supported by said framework, one of said supporting platforms being normally positioned forwardly of and in a plane above the other and being horizontally shiftable in a forward and rearward direction, a rack slidably mounted on said framework for horizontal forward or rearward movement thereon, an arm fixed to and depending from said shiftable platform adjacent the rear end thereof and pivotally connected to said rack for causing horizontal movement of said shiftable platform when said rack is caused to move on said framework, and said other platform being fixed against horizontal shifting movement on said framework and being tiltable about a horizontal pivot for dumping the load therefrom, and said shiftable platform being tiltable about its pivotal connection with said rack for dumping the load therefrom when said shiftable platform has been shifted rearwardly over said other platform and its pivotal connection is in substantial vertical alignment with said horizontal pivot, and mechanism for causing movement of said rack and further means for tilting each of said platforms, and said rack and framework being provided with coactive means stopping rearward movement of said rack when said pivotal connection is in substantial vertical alignment with said horizontal pivot.

References Cited in the file of this patent

UNITED STATES PATENTS

| | | |
|---|---|---|
| 372,775 | Stumpf | Nov. 8, 1887 |
| 1,195,519 | Sior | Apr. 22, 1916 |
| 1,288,175 | Pittman | Dec. 17, 1918 |
| 1,468,951 | Anthony | Sept. 23, 1923 |
| 1,480,220 | Ochsner | Jan. 8, 1924 |
| 1,533,453 | Paynter | Apr. 14, 1925 |
| 1,763,342 | Coddington | June 10, 1930 |
| 2,172,405 | Powell | Sept. 12, 1939 |
| 2,741,383 | Leckert | Apr. 10, 1956 |
| 2,788,137 | Harkness | Apr. 9, 1957 |
| 2,800,086 | Wike | July 23, 1957 |